US008127231B2

(12) United States Patent
Lemons et al.

(10) Patent No.: US 8,127,231 B2
(45) Date of Patent: Feb. 28, 2012

(54) SYSTEM AND METHOD FOR AUDIO EQUALIZATION

(75) Inventors: Kenneth R. Lemons, Indianapolis, IN (US); Hall Corey, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 862 days.

(21) Appl. No.: 12/148,584

(22) Filed: Apr. 21, 2008

(65) Prior Publication Data

US 2008/0270904 A1 Oct. 30, 2008

Related U.S. Application Data

(60) Provisional application No. 60/912,745, filed on Apr. 19, 2007, provisional application No. 60/912,790, filed on Apr. 19, 2007, provisional application No. 61/025,542, filed on Feb. 1, 2008.

(51) Int. Cl.
*G06F 3/00* (2006.01)
*G09B 15/02* (2006.01)

(52) U.S. Cl. ........ 715/727; 715/716; 715/834; 715/835; 715/765; 84/483.2

(58) Field of Classification Search .................. 715/700, 715/727, 764, 765, 781, 834, 856, 866, 716, 715/719, 771, 835; 84/464 R, 470 R, 471 R, 84/472, 483.2
See application file for complete search history.

(56) References Cited

U.S. PATENT DOCUMENTS

| | | | |
|---|---|---|---|
| 347,686 | A | 8/1886 | Carpenter et al. |
| 2,804,500 | A | 8/1957 | Giacoletto |
| 3,698,277 | A | 10/1972 | Barra |
| 3,969,972 | A | 7/1976 | Bryant |
| 4,128,846 | A | 12/1978 | Robinson, Jr. |
| 4,172,406 | A | 10/1979 | Martinez |
| 4,257,062 | A | 3/1981 | Meredith |
| 4,378,466 | A | 3/1983 | Esser |
| 4,526,168 | A | 7/1985 | Hassler et al. |
| 4,887,507 | A | 12/1989 | Shaw |
| 4,907,573 | A | 3/1990 | Nagasaki |
| 5,048,390 | A | 9/1991 | Adachi et al. |
| 5,207,214 | A | 5/1993 | Romano |
| 5,370,539 | A | 12/1994 | Dillard |
| 5,415,071 | A | 5/1995 | Davies |
| 5,563,358 | A | 10/1996 | Zimmerman |

(Continued)

FOREIGN PATENT DOCUMENTS

EP 0349686 A1 1/1990

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner* — Xiomar L Bautista
(74) *Attorney, Agent, or Firm* — Woodard, Emhardt, Moriarty, McNett & Henry LLP

(57) ABSTRACT

The present disclosure relates to audio equalization devices and methods. A system is provided that permits frequency equalization or balancing of frequency response for stereo or multiple surround sound channels through the use of visual representation of audio signals. The system also permits the balancing or "tuning" of concert venues and audio listening environments by generating visualizations for original and reflected audio signals.

20 Claims, 20 Drawing Sheets
(13 of 20 Drawing Sheet(s) Filed in Color)

U.S. PATENT DOCUMENTS

| | | | |
|---|---|---|---|
| 5,741,990 | A | 4/1998 | Davies |
| 5,784,096 | A | 7/1998 | Paist |
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,265,651 | B1 | 7/2001 | Landtroop |
| 6,350,942 | B1 | 2/2002 | Thomson |
| 6,390,923 | B1 | 5/2002 | Yoshitomi et al. |
| 6,392,131 | B2 | 5/2002 | Boyer |
| 6,407,323 | B1 | 6/2002 | Karapetian |
| 6,411,289 | B1 | 6/2002 | Zimmerman |
| 6,414,230 | B2 | 7/2002 | Randall |
| 6,448,487 | B1 | 9/2002 | Smith |
| 6,544,123 | B1 | 4/2003 | Tanaka et al. |
| 6,686,529 | B2 | 2/2004 | Kim |
| 6,750,386 | B2 | 6/2004 | King |
| 6,791,568 | B2 | 9/2004 | Steinberg et al. |
| 6,841,724 | B2 | 1/2005 | George |
| 6,856,329 | B1 | 2/2005 | Peevers et al. |
| 6,927,331 | B2 | 8/2005 | Haase |
| 6,930,235 | B2 | 8/2005 | Sandborn et al. |
| 6,987,220 | B2 | 1/2006 | Holcome |
| 7,030,307 | B2 | 4/2006 | Wedel |
| 7,096,154 | B1 | 8/2006 | Andrade-Cetto |
| 7,153,139 | B2 | 12/2006 | Wen et al. |
| 7,182,601 | B2 | 2/2007 | Donnan |
| 7,202,406 | B2 | 4/2007 | Coleman |
| 7,212,213 | B2 | 5/2007 | Steinberg et al. |
| 7,271,328 | B2 | 9/2007 | Pangrie |
| 7,271,329 | B2 | 9/2007 | Franzblau |
| 7,400,361 | B2 | 7/2008 | Noske et al. |
| 7,439,438 | B2 | 10/2008 | Hao |
| 7,521,619 | B2 | 4/2009 | Salter |
| 7,538,265 | B2 | 5/2009 | Lemons |
| 7,634,405 | B2 | 12/2009 | Basu et al. |
| 7,663,043 | B2 | 2/2010 | Park |
| 7,667,125 | B2 | 2/2010 | Taub et al. |
| 7,714,222 | B2 | 5/2010 | Taub et al. |
| 2002/0050206 | A1 | 5/2002 | MacCutcheon |
| 2002/0176591 | A1 | 11/2002 | Sandborn et al. |
| 2003/0205124 | A1 | 11/2003 | Foote et al. |
| 2004/0089132 | A1 | 5/2004 | Georges et al. |
| 2004/0148575 | A1 | 7/2004 | Haase |
| 2004/0206225 | A1 | 10/2004 | Wedel |
| 2005/0190199 | A1 | 9/2005 | Brown et al. |
| 2005/0241465 | A1 | 11/2005 | Goto |
| 2006/0107819 | A1 | 5/2006 | Salter |
| 2006/0132714 | A1 | 6/2006 | Nease et al. |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0034947 | A1 | 2/2008 | Sumita |
| 2008/0115656 | A1 | 5/2008 | Sumita |
| 2008/0190271 | A1 | 8/2008 | Taub et al. |
| 2008/0245212 | A1 | 10/2008 | Lemons |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0276793 | A1 | 11/2008 | Yamashita et al. |
| 2008/0314228 | A1 | 12/2008 | Dreyfuss et al. |
| 2009/0223348 | A1 | 9/2009 | Lemons |
| 2010/0154619 | A1 | 6/2010 | Taub et al. |

FOREIGN PATENT DOCUMENTS

| | | | |
|---|---|---|---|
| EP | 456 860 | A1 | 11/1991 |
| EP | 1354561 | A1 | 10/2003 |
| JP | 05-252856 | | 9/1993 |
| JP | 2004-226556 | A | 8/2004 |
| KR | 10-2006-0110988 | | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curves/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search Report mailed on Sep. 18, 2008 for CPT?US2008/005072.

Patent Application Search Report mailed on Sep. 24, 2008 for PCT/US2008/005125.

Patent Application Search Report mailed on Sep. 29, 2008 for PCT/US2008/005074.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US2008/005077.

Patent Application Search Report mailed on Jul. 31, 2008 for PCT/US2008/005070.

Patent Application Search Report mailed on Sep. 18, 2008 for PCT/US2008/005124.

Rabiner, Huang "Fundamentals of Speech Recognition," PTR Prentice-hall, Inc., 1993, ISBN 0-13-285826-6, pp. 21-31, 42-68; Fig. 2.17,2.32.

Patent Application Search Report mailed on Aug. 25, 2009 for PCT/US2009/000684.

Written Opinion mailed on Aug. 25, 2009 for PCT/US2009/00684.

SYSTEM AND METHOD FOR AUDIO EQUALIZATION

CROSS-REFERENCE TO RELATED APPLICATIONS

The present application claims the benefit of U.S. Provisional Patent Application Ser. No. 60/912,745, filed Apr. 19, 2007, entitled "Audio Equalization and Balancing Using Visualization of Tonal and Rhythm Structures", U.S. Provisional Patent Application Ser. No. 60/912,790, filed Apr. 19, 2007, entitled "Method and Apparatus for Tuning a Musical Performance Venue Using Visualization of Tonal and Rhythm Structures", and U.S. Provisional Patent Application Ser. No. 61/025,542 filed Feb. 1, 2008 entitled "Apparatus and Method of Displaying Infinitely Small Divisions of Measurement." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to sound measurement and, more specifically, to a system and method for audio equalization using analysis of tonal and rhythmic structures.

BACKGROUND OF THE DISCLOSURE

The response of an audio amplification system will generally exhibit imperfections when measured across the range of audible frequencies. This is due to both the quality of the system components and the effects of the physical environment in which the system is being used. Multi-use facilities, such as large auditoriums, often exhibit poor acoustics, making it especially difficult to achieve an acceptable frequency response when the facility is used as a concert venue. Even specially designed music studios may require fine tuning of their audio systems to compensate for environmental effects.

Equalization and balancing of these systems is typically accomplished by devices that provide visual indications of sound volume or signal amplitude at discrete select frequencies throughout the audio spectrum. These amplitude indicators usually take the form of vertically oriented lines whose height indicates the relative amplitude level as compared to other frequencies. Controls are provided to change or adjust the amplitude of these signals, which in effect adjust the signal level, and hence sound volume, over a frequency range centered around the select frequency. Equalizers for expensive, high-end equipment may provide more frequency ranges that can be adjusted so that more precise equalization or signal balancing can be affected, but equalization controls in high-end equipment is still often made by adjusting the height of a vertical line or bar. Methods and devices are needed which improve the audio equalization process for amplification systems and listening environments.

SUMMARY OF THE INVENTION

Accordingly, in one aspect, an audio of equalization system is disclosed comprising: a user control device, a processing device, and a display; wherein said processing device is capable of creating a visual representation of input sound signals for output on said display; and wherein said visual representation of generated according to a method comprising the steps of: (a) labeling the perimeter of a circle with a plurality of labels corresponding to a plurality of frequency bands, such that moving radially inward or outward from any one of said labels represents a change in a signal amplitude at the frequency corresponding to said one of first labels; (b) identifying a first occurrence of a signal having a first amplitude at a first frequency; and (c) graphically indicating a point along a radial axis corresponding to said first amplitude; said radial axis connecting the center of said circle and said first label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
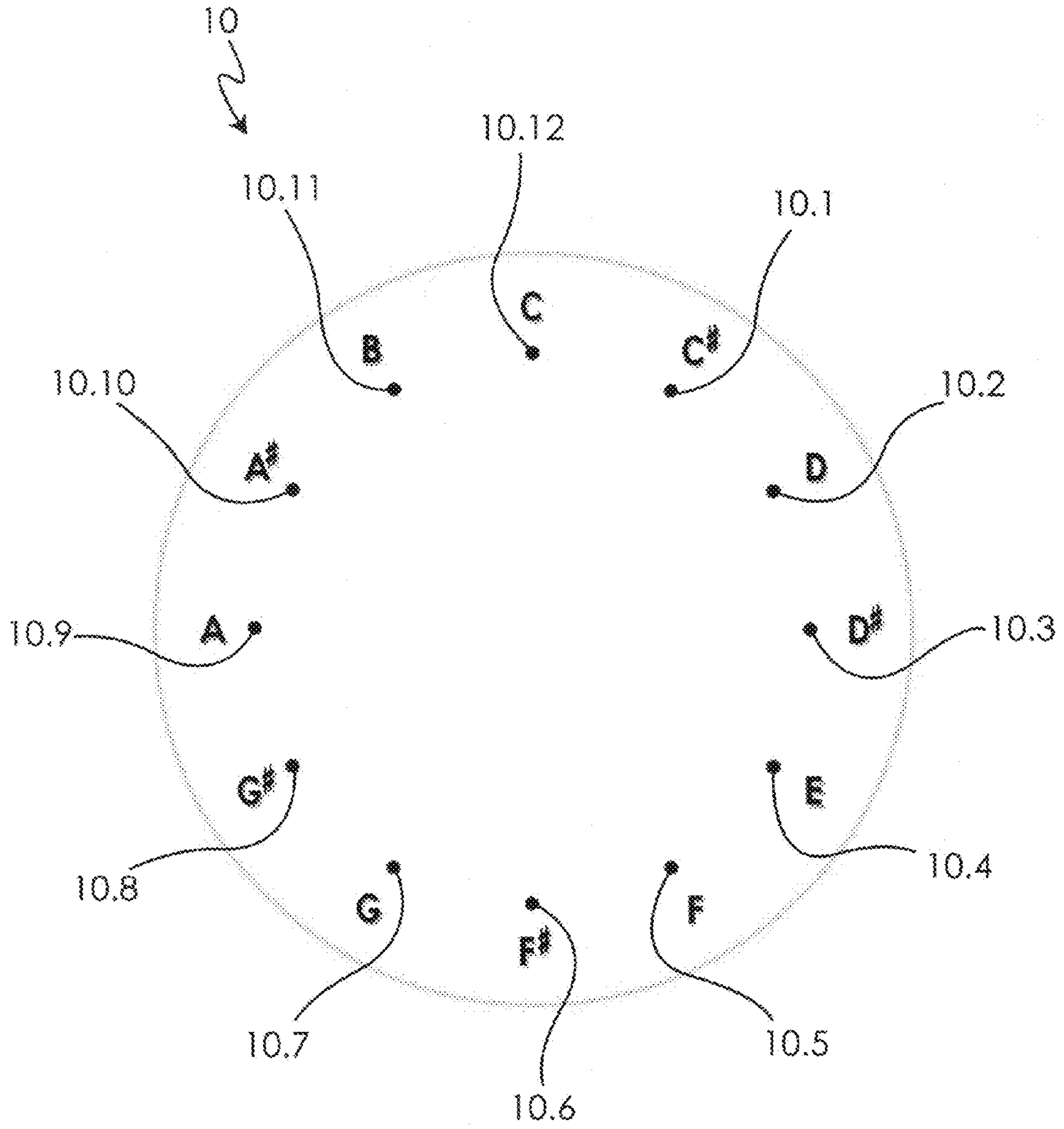
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for audio equalization, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

Major scale: 2 steps, 2 steps, 1 step, 2 steps, 2 steps, 2 steps, 1 step

Harmonic Minor Scale: 2, 1, 2, 2, 1, 3, 1

Melodic Minor Scale: 2, 1, 2, 2, 2, 2, 1

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^{\#}$ or $G^{b}$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^{\#}$ is the same as $B^{b}$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
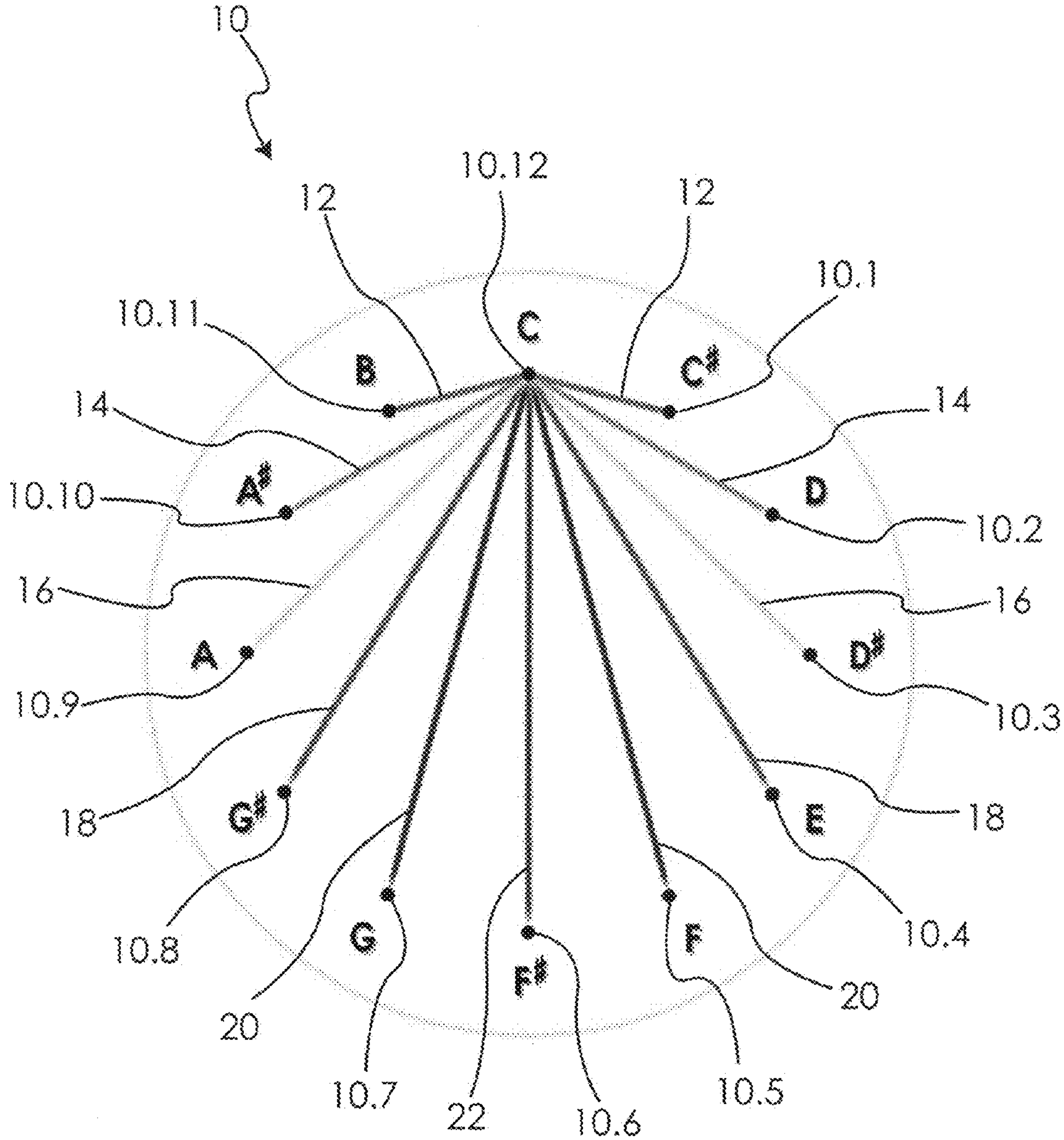
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and $A^{\#}$ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
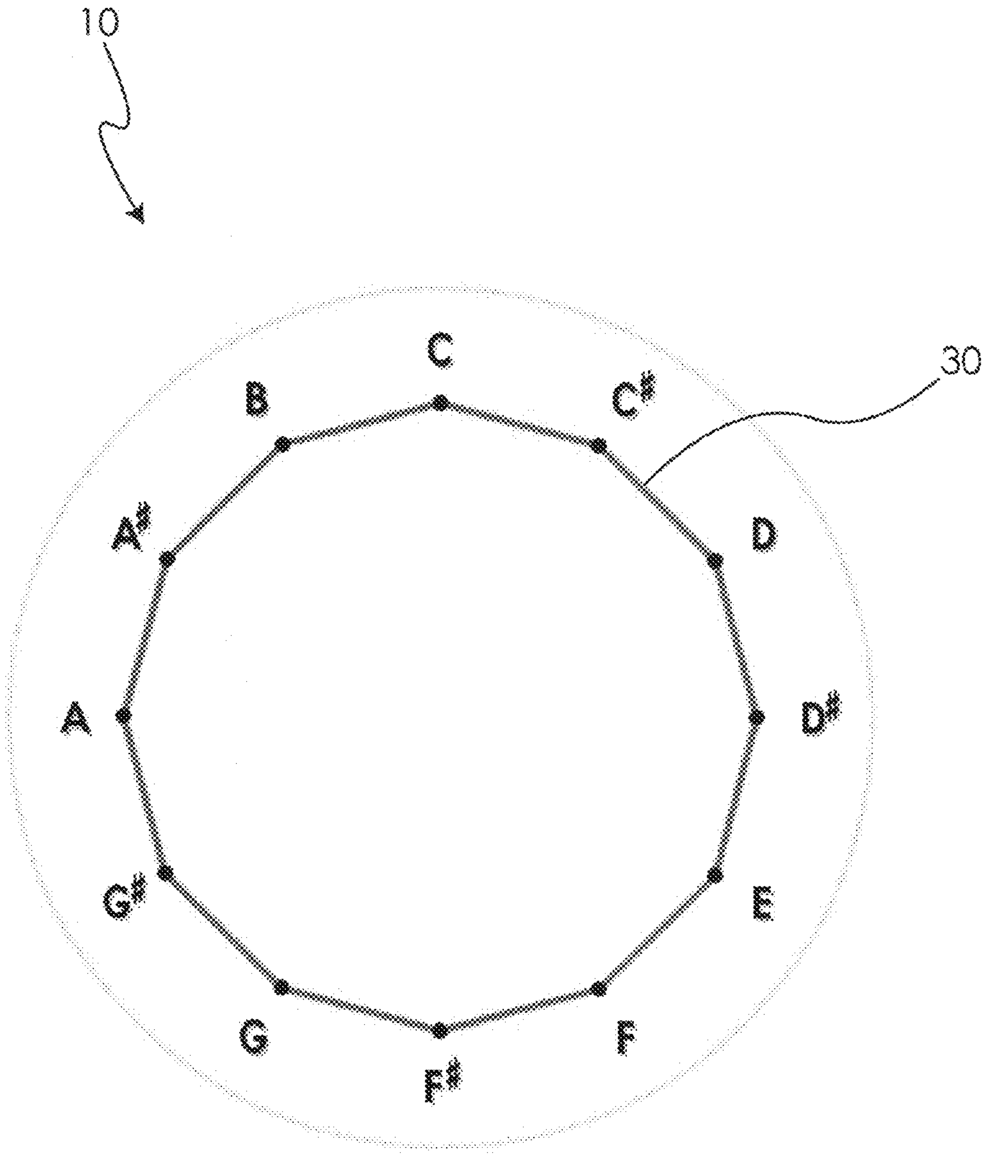
FIG. 3 is a diagram of a twelve-tone circle showing the chromatic scale.
Figure 4:
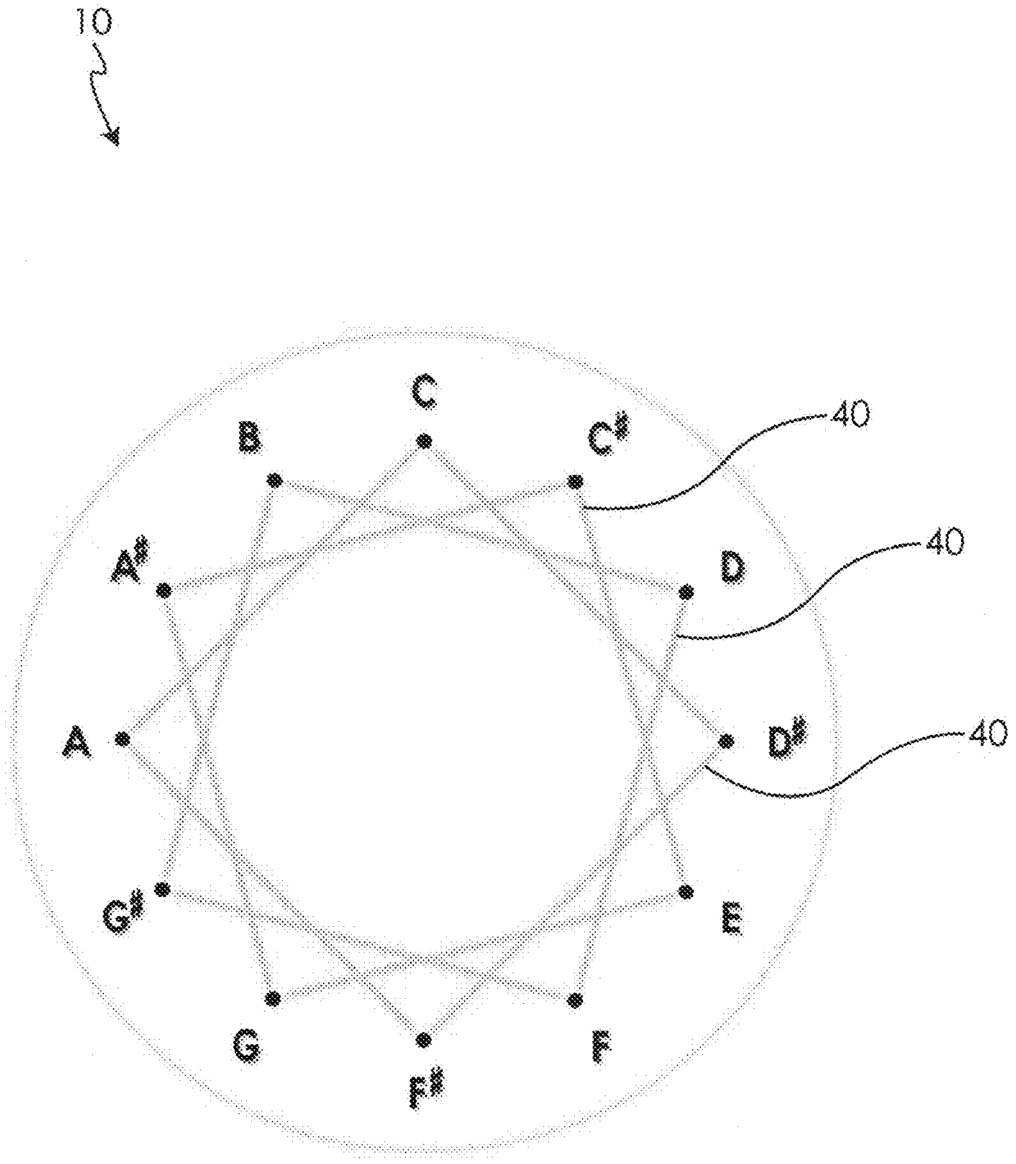
FIG. 4 is a diagram of a twelve-tone circle showing the first through third diminished scales.
Figure 5:
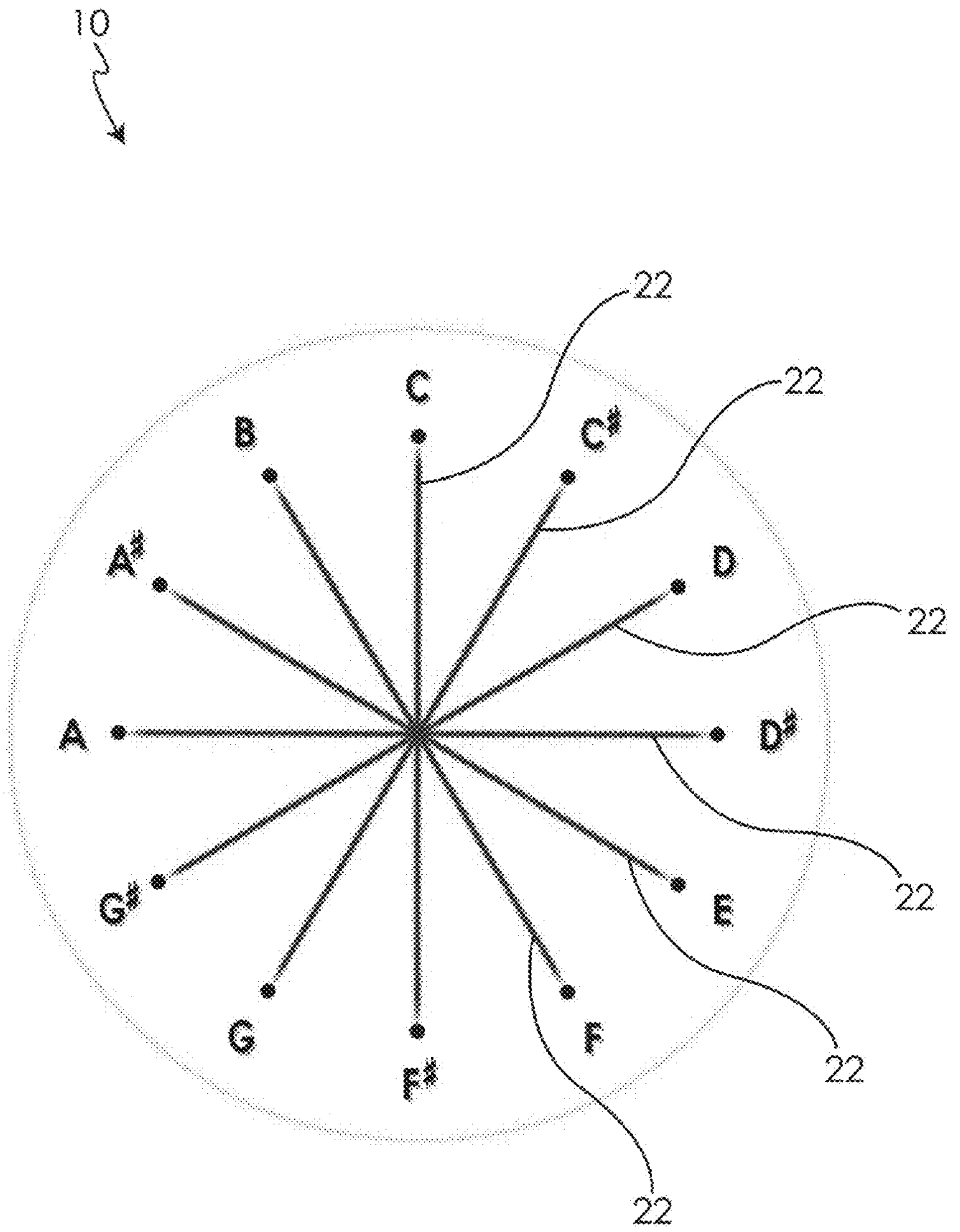
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
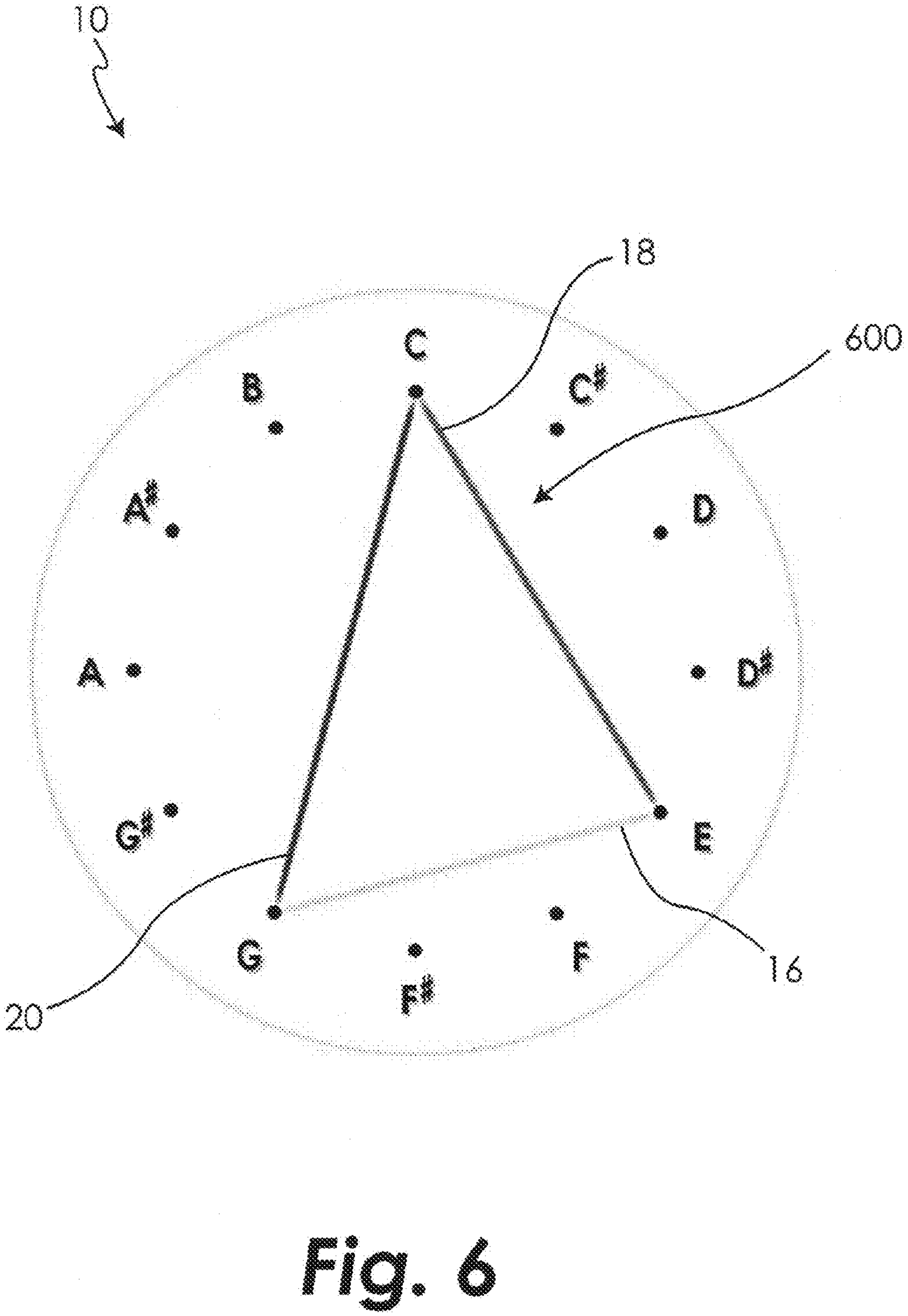
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
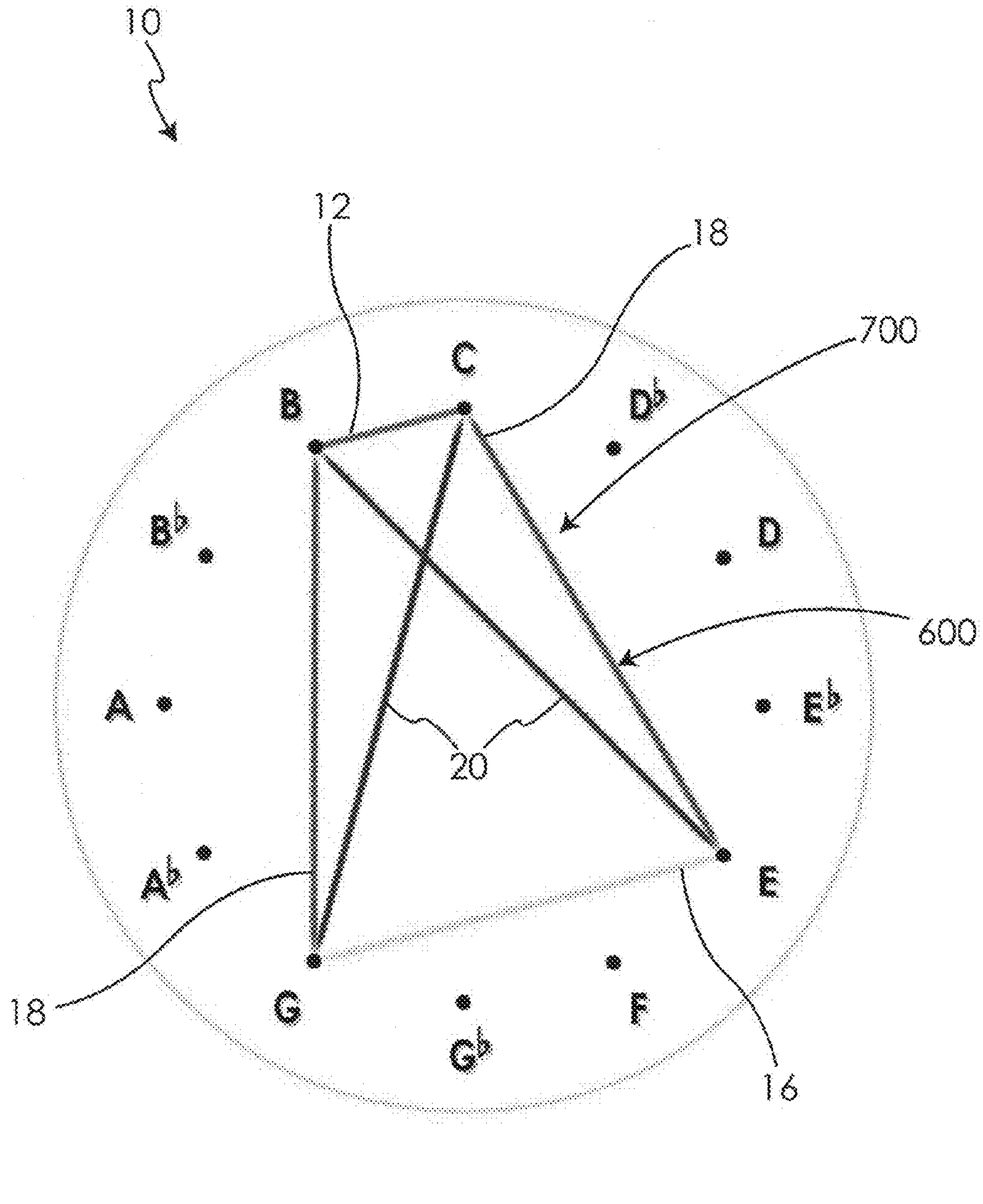
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
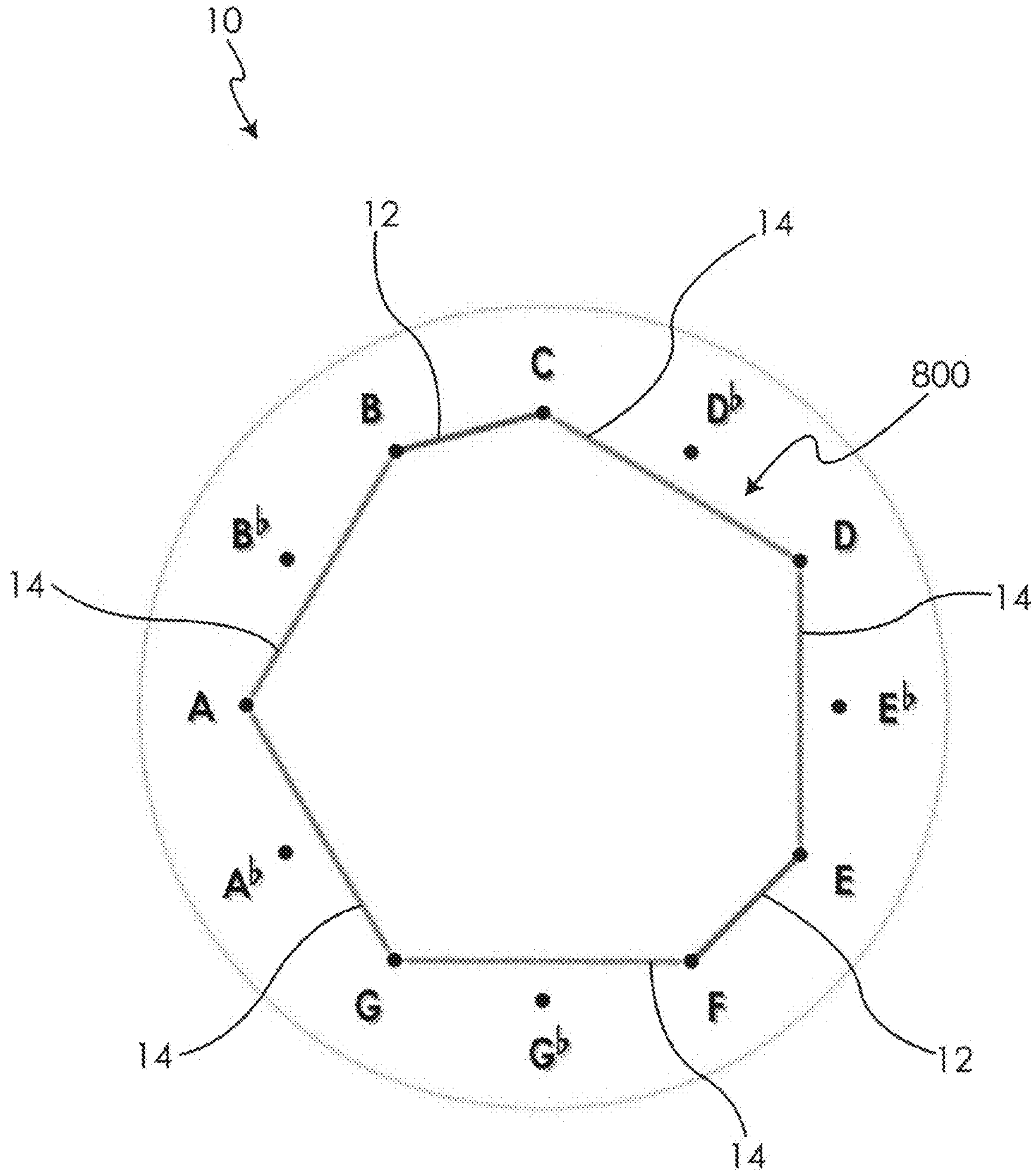
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
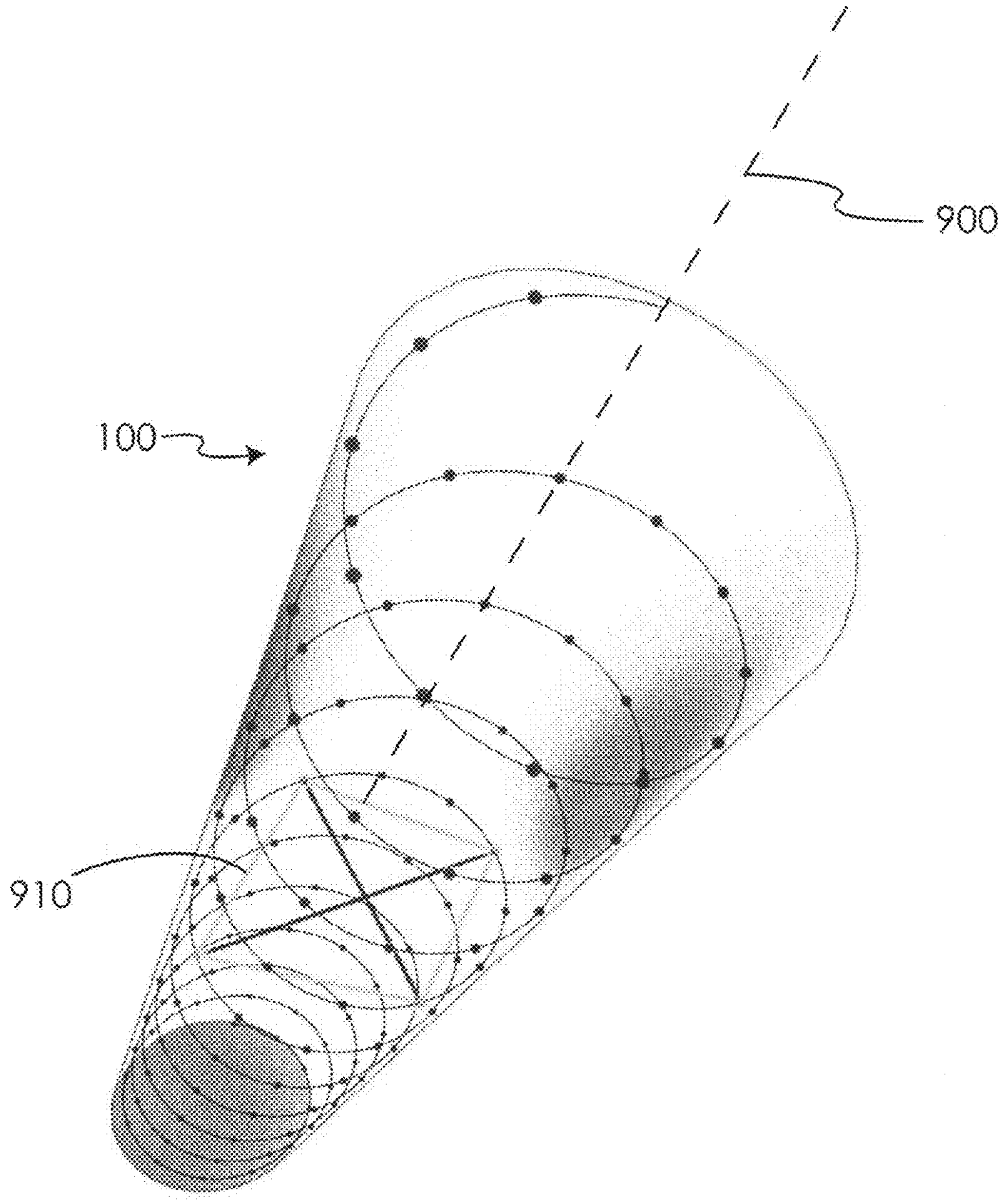
FIGS. 9-10 are diagrams of a helix showing a B diminished seventh chord.
Figure 10:
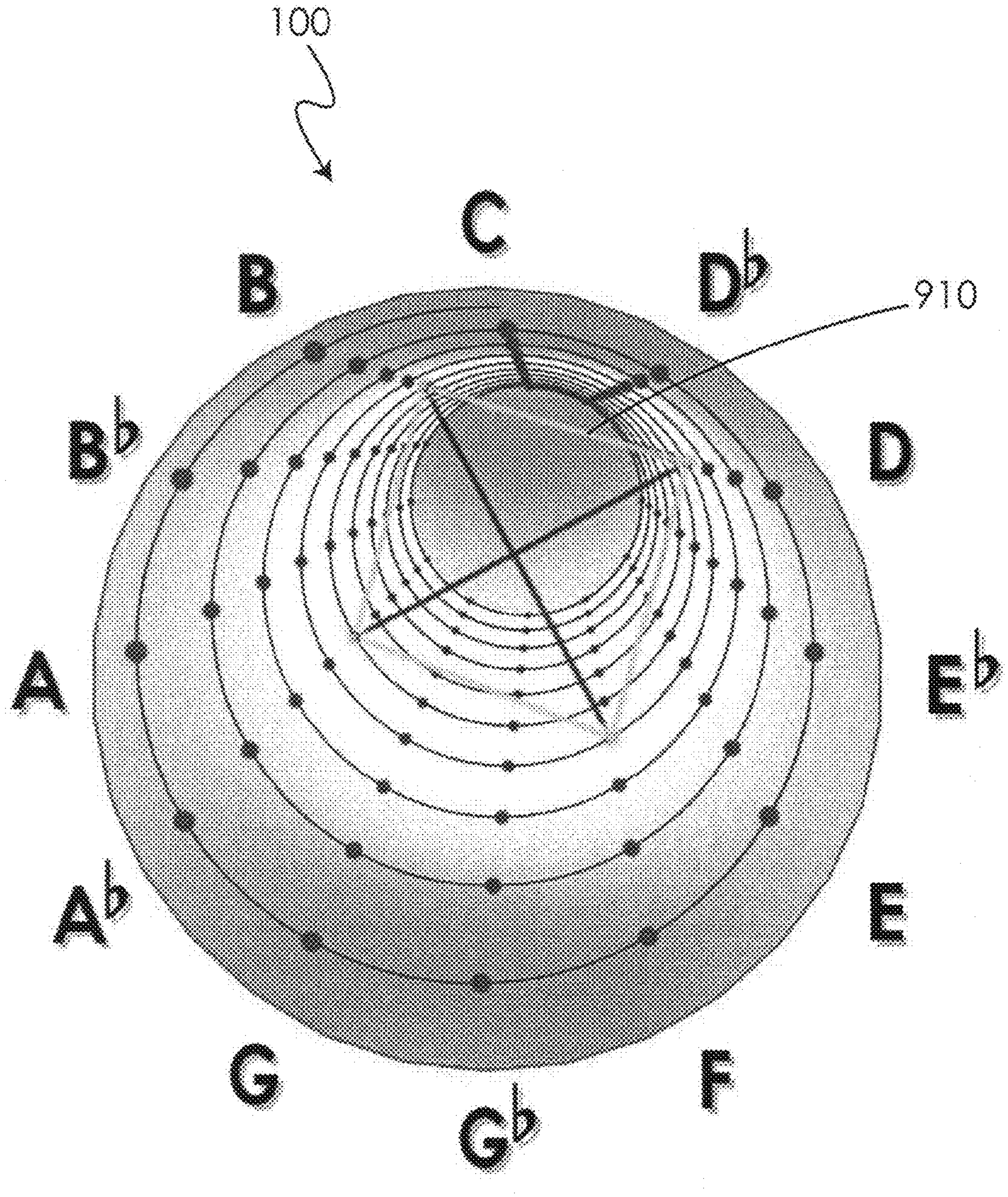

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
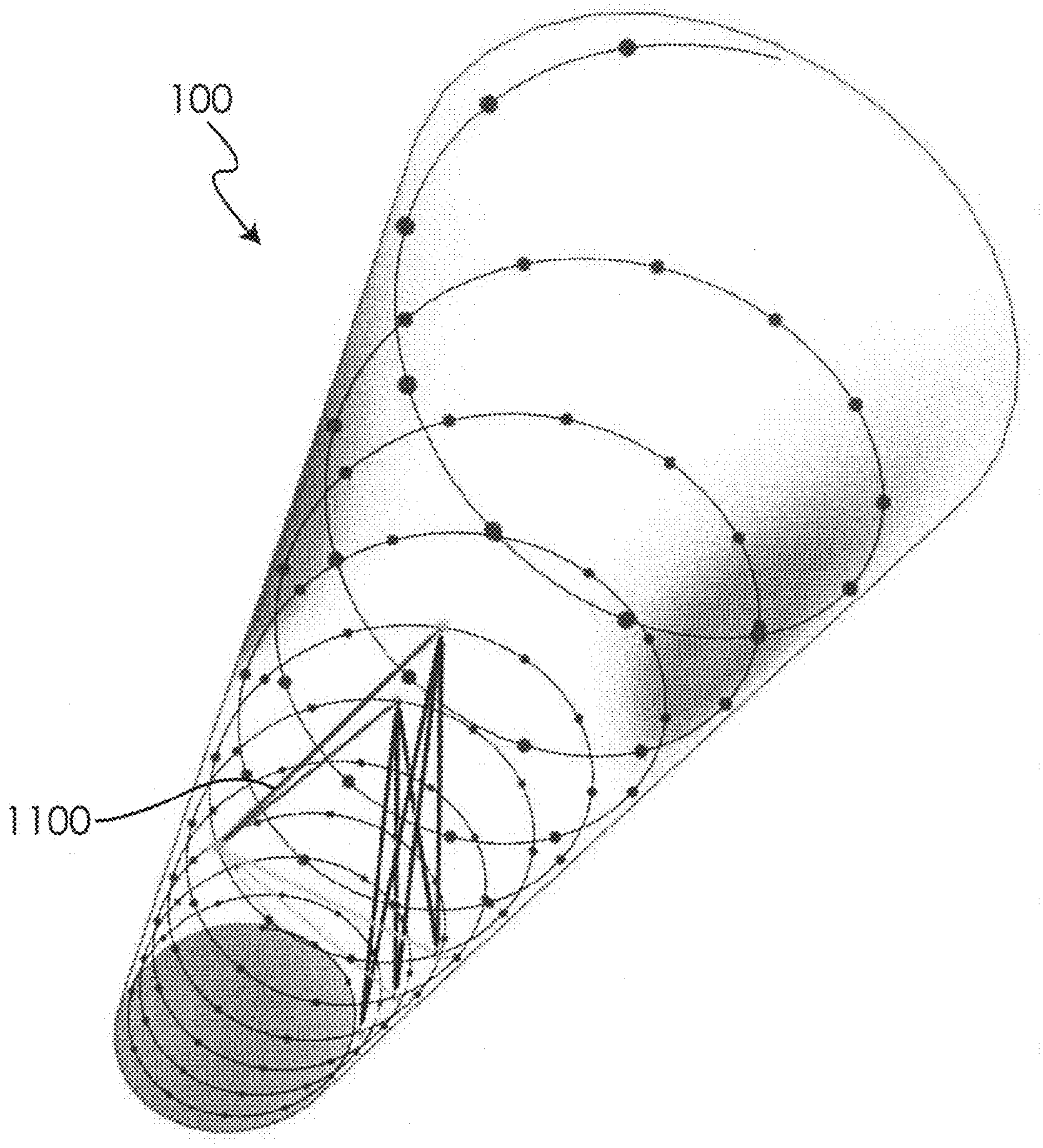
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
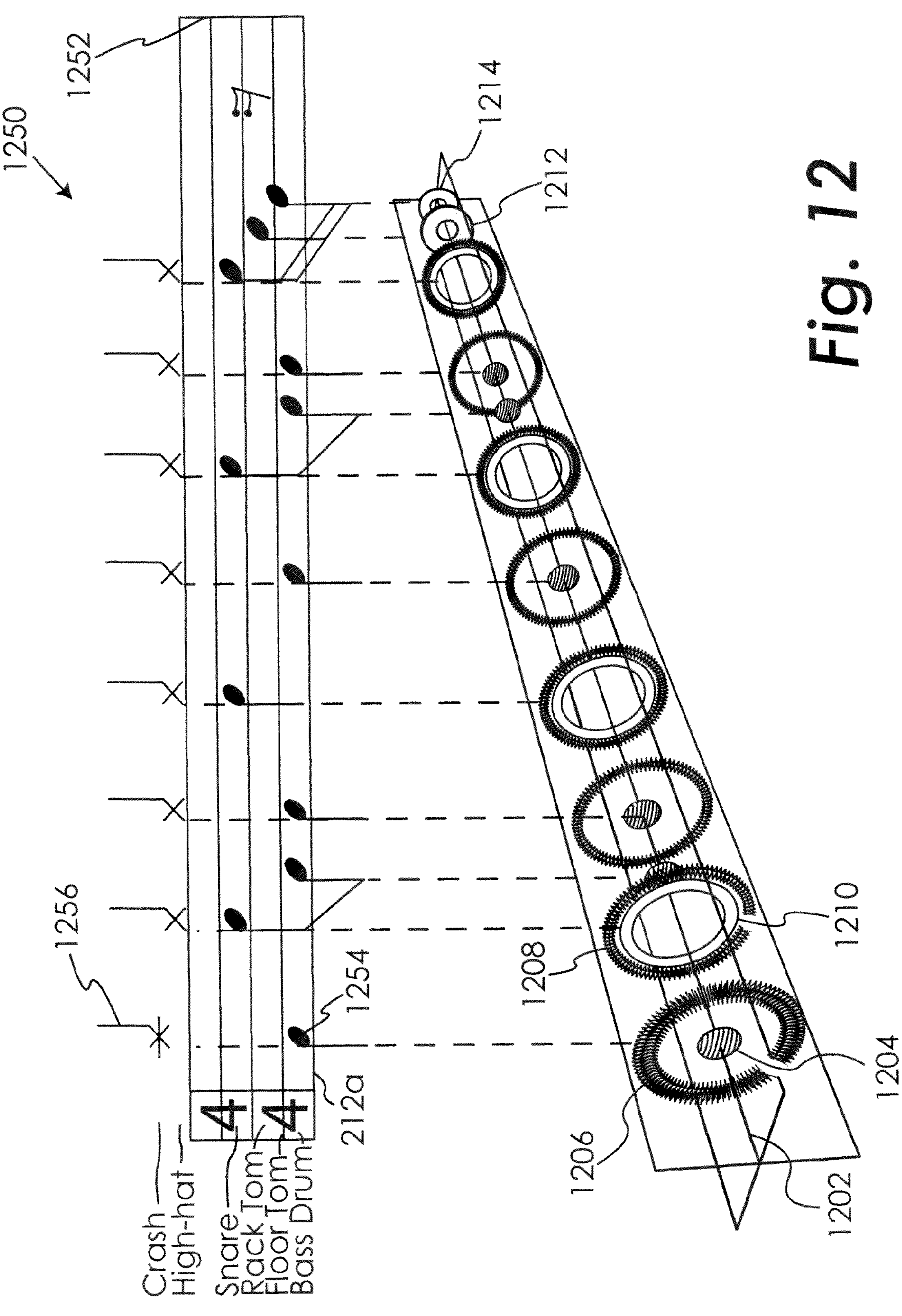
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
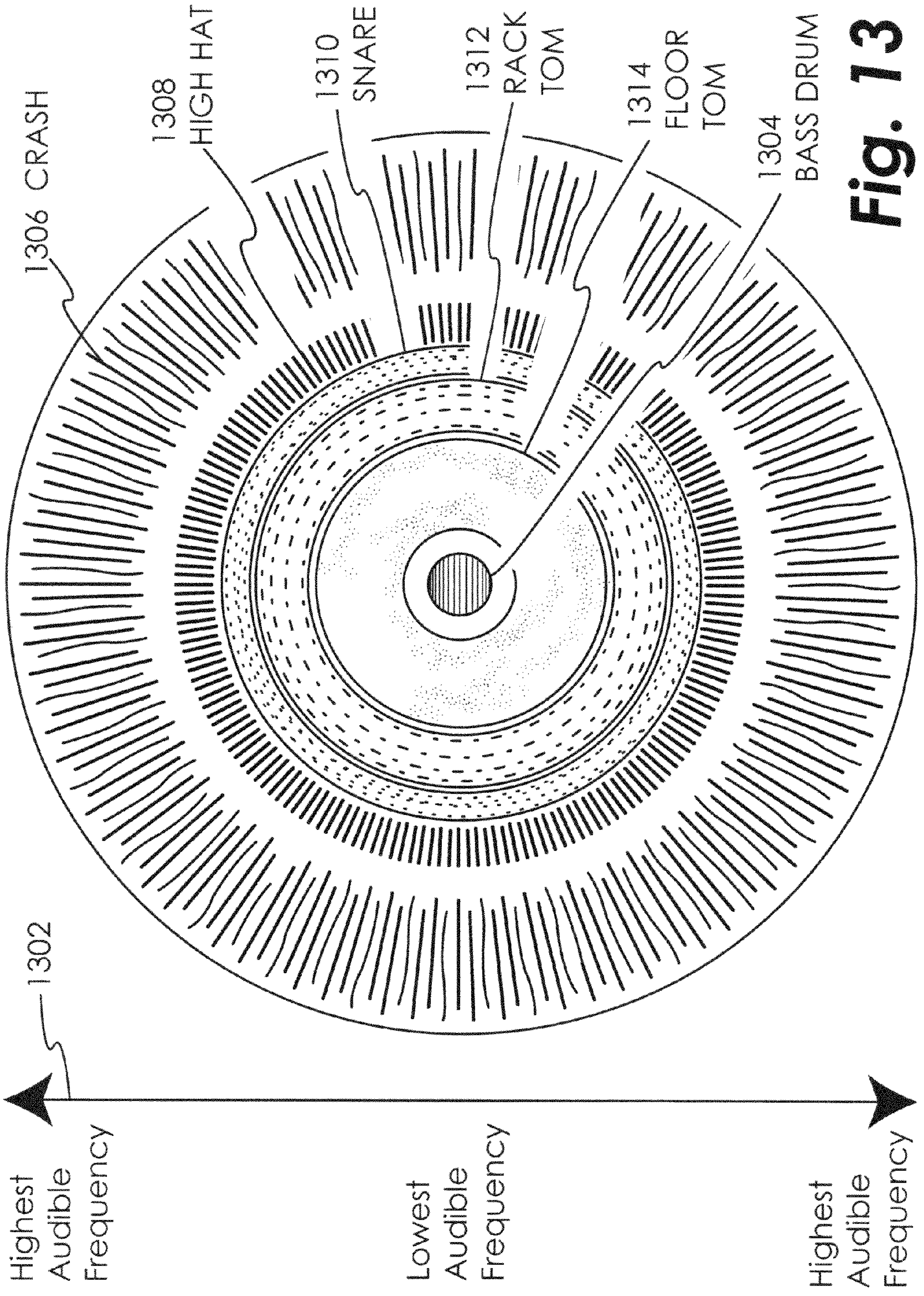
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
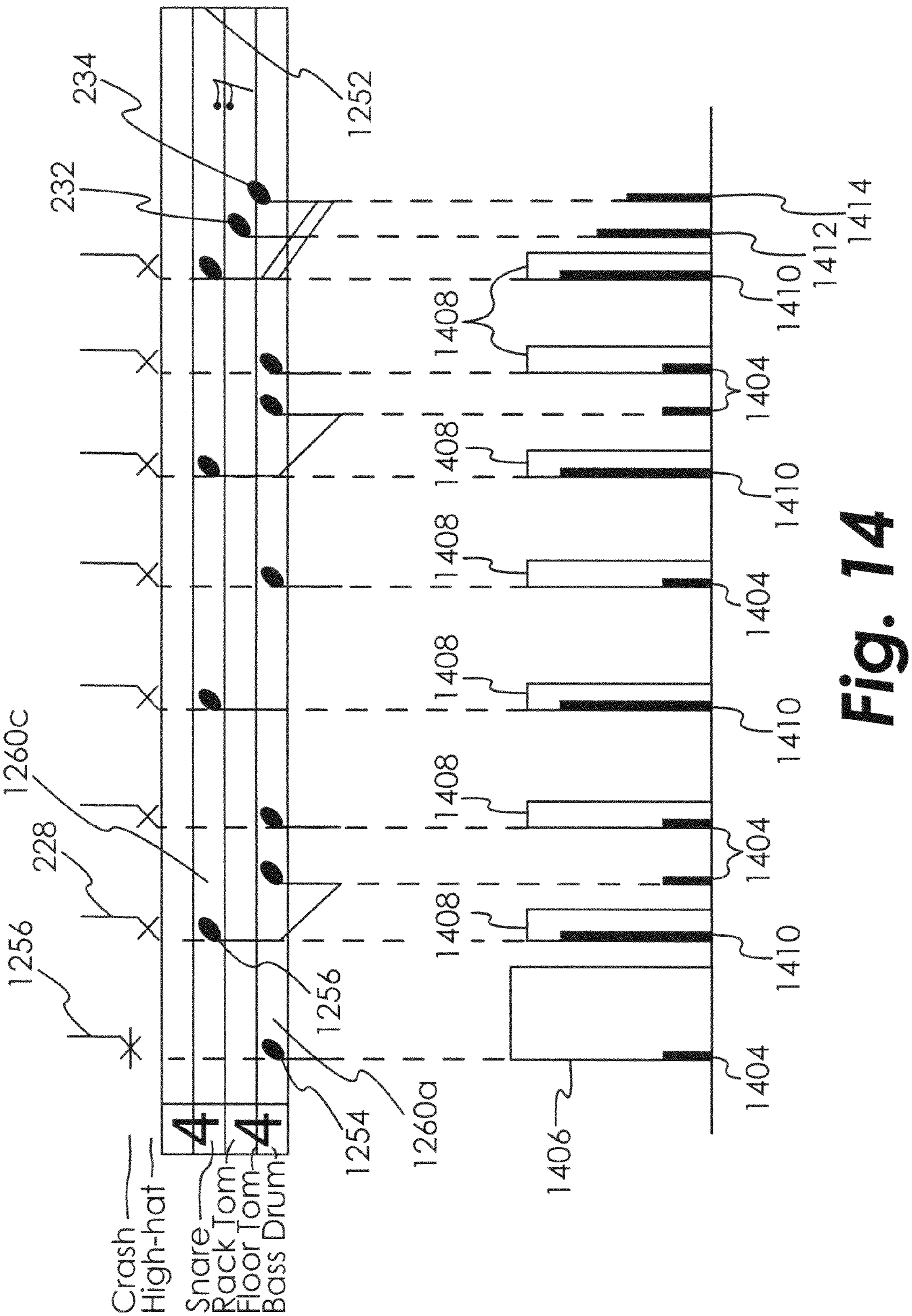
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260*a* of staff 1252. Likewise, bar 1410 (representing the snare drum) will be converted to a note 1256 in the second highest space 1260*c* of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as a basis for an audio equalization system. The easily visualized tonal and rhythmic shapes provide a much more intuitive graphical format for purposes of interpreting and balancing the frequency response of stereo or multiple "surround sound" audio amplification systems. The disclosed methods are also applicable to the acoustic balancing or "tuning" of performance venues, allowing a user to more efficiently correct anomalies in the frequency response of a particular listening environment.

Figure 15:
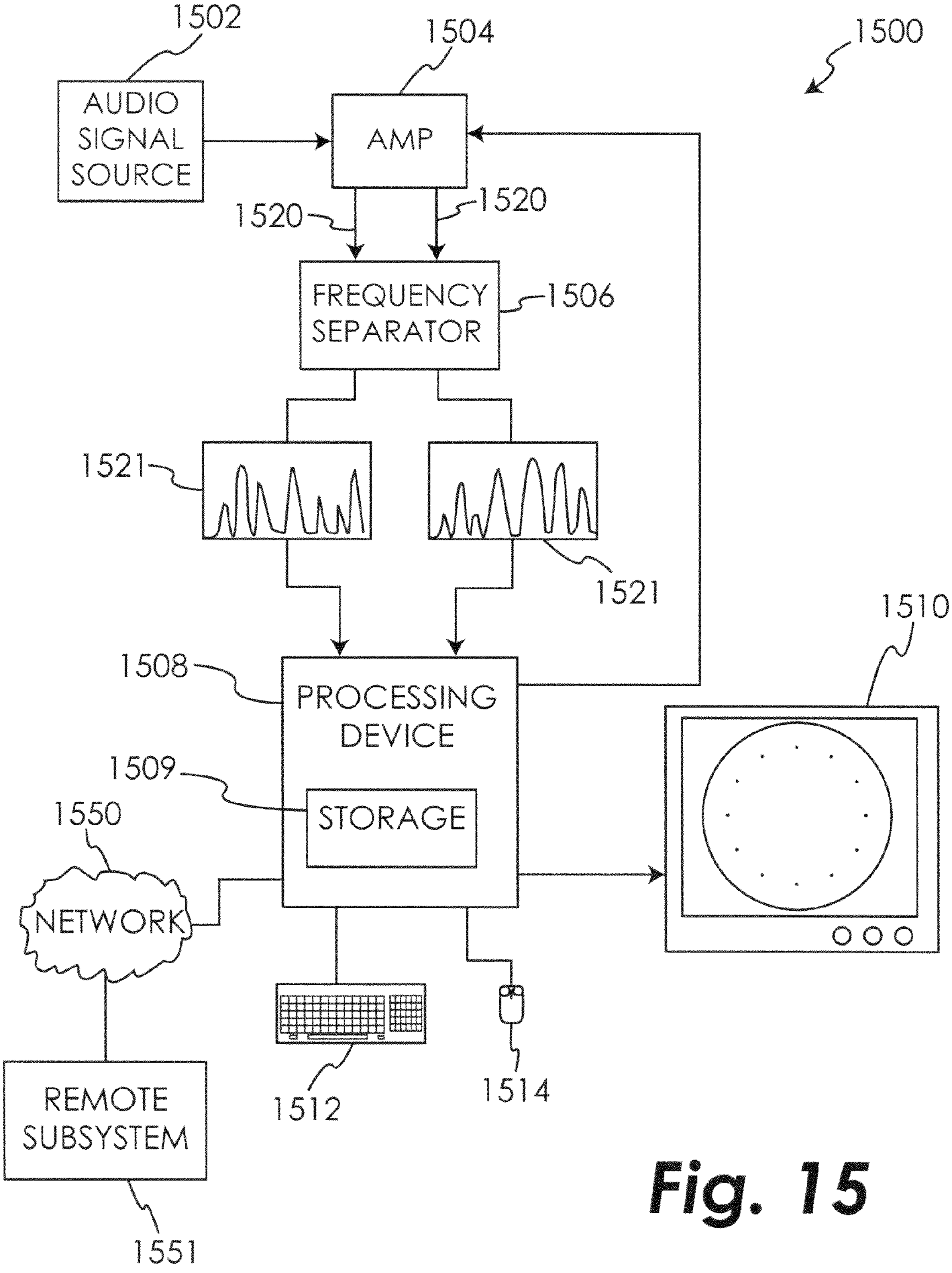
FIG. 15 is a schematic block diagram showing an audio equalization system according to one embodiment.

FIG. 15 shows, in schematic form, one embodiment of an audio equalization system 1500 according to the present disclosure. It is understood that one or more of the functions described herein may be implemented as either hardware or software, and the manner in which any feature or function is described does not limit such implementation only to the manner or particular embodiment described. The system 1500 may include an audio signal source 1502, an audio amplifier 1504, a frequency separator 1506, a processing device 1508, a data storage device 1509, a display 1510, and one or more user control devices 1512. Although the system 1500 is described as including an audio amplifier, frequency separator and audio signal source, it is understood that system 1500 may be configured to operate with an external or existing amplifier and frequency separation unit, wherein the processing device receives the signals from these devices and generates corresponding visualizations.

Audio signal source 1502 may be capable of creating various tones and rhythms at frequencies that span the audio spectrum, such as pure sine wave tones, square wave tones, multiple harmonic tones, pink or white noise signals, and percussive sounds, as several non-limiting examples. The signals output from audio signal source 1502 may be generated by dedicated oscillator circuitry or read from removable storage media. Signal generator 1502 may also comprise a digital music player such as an MP3 device or CD player, an analog music player, instrument or device with appropriate interface, transponder and analog-to-digital converter, or a digital music file, as well as other input devices and systems.

Audio amplifier 1504 may comprise a single or multiple channel analog or digital audio amplification device. In certain embodiments, audio amplifier 1504 may comprise a separate preamplifier/amplifier combination or an integrated receiver having an FM tuner and amplifier in a single piece of equipment.

Frequency separator 1506 may be implemented as a bank or series of band pass filters, for example, or as other components or circuitry having similar functional characteristics.

The processing device 1508 may be implemented on a personal computer, a workstation computer, a laptop computer, a palmtop computer, a wireless terminal having computing capabilities (such as a cell phone having a Windows CE or Palm operating system), an embedded processor system, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the user control device 1512 is coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a light emitting diode device (LED), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at user control device 1512 is used to direct the flow of instructions executed by the processor. User control device 1512 may comprise a data entry keyboard, a mouse or equivalent trackball device, or electro-mechanical knobs and switches. The results of this processing execution are then displayed on display device 1510.

The processing device 1508 is configured to generate an output for viewing on the display 1510. Preferably, the video output to display 1510 is also a graphical user interface, allowing the user to interact with the displayed information.

The system 1500 may optionally include one or more remote subsystems 1551 for communicating with processing device 1508 via a network 1550, such as a LAN, WAN or the internet. Remote subsystem 1550 may be configured to act as a web server, a client or both and will preferably be browser enabled. Thus with system 1500, a user can perform audio equalization of system 1500 remotely.

In operation, audio amplifier 1504 receives an input from audio signal source 1502. The audio signal source may be in the form of single or multiple channel audio program material. The audio amplifier 1504 separates the input program material into individual channels 1520 and outputs the resulting signals to the frequency separator 1506. The frequency separator 1506 separates the individual channel signals into discrete frequency bands 1521, illustratively shown in FIG. 15. The number of frequency bands, and the precision or degree of definition within each band, is dependent upon the design as well as the quality of the circuit components of frequency separator 1506. The separated or discrete frequency bands 1521 are applied to processing device 1508, which creates tonal and rhythm visualizations components, which are output to display 1510. Separate visualizations may be generated for each of the discrete frequency bands 1521 for each channel 1520 of amplifier 1504 that is applied to frequency separator 1506. By viewing a more complete representation of the audio signals provided by the processing device 1502 than is available in conventional equalizers, precise adjustment of volume and signal levels for frequency ranges in each sound channel can be made. User control device 1512 also provides a means for adjusting the characteristics of the frequency ranges or bands. User control device 1512 may be configured to provide a user-selectable level or degree of adjustment over the audio characteristics of the signals from processing device 1508.

Figure 16:
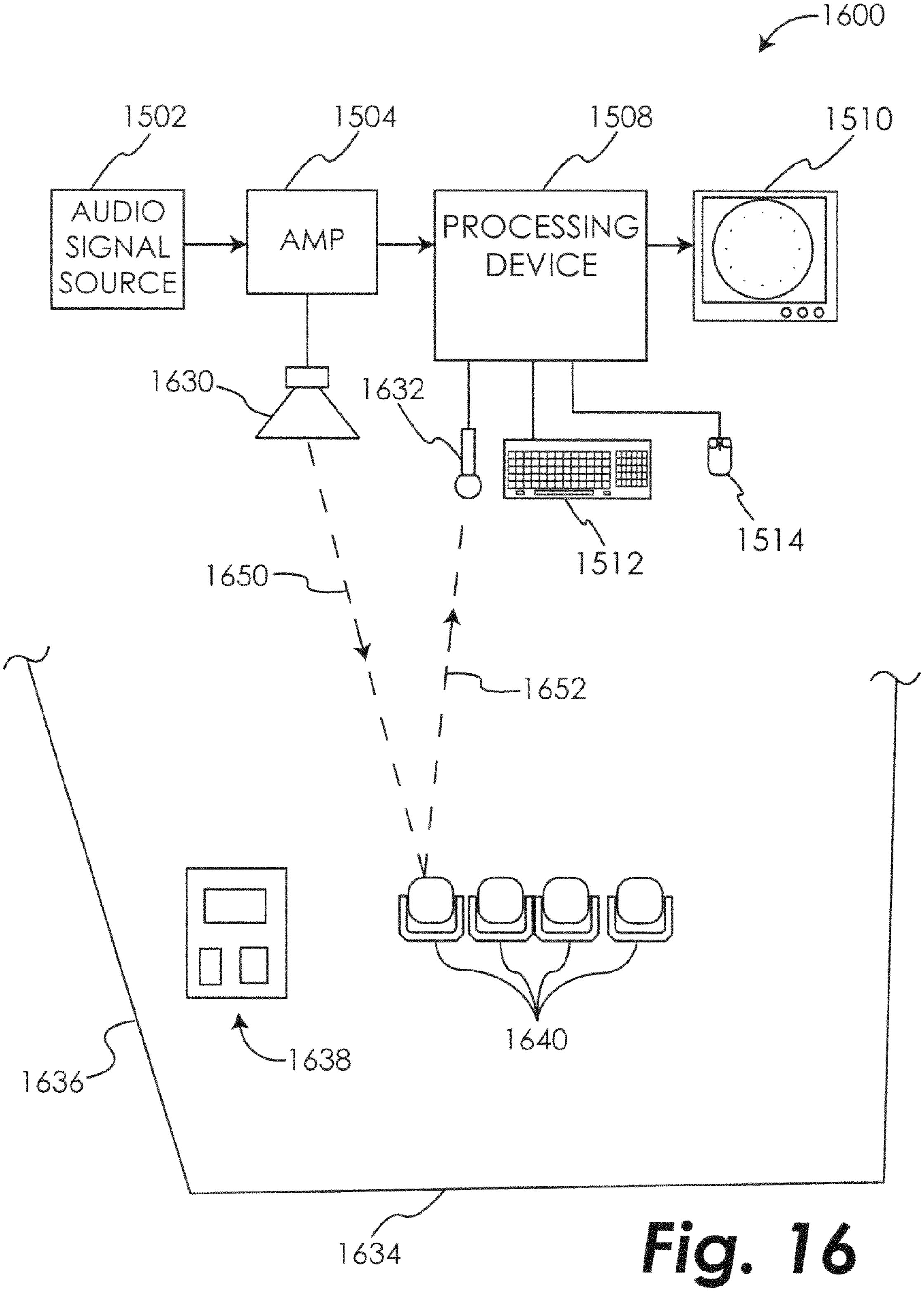
FIG. 16 is a schematic block diagram showing an audio equalization system for tuning a listening environment according to one embodiment.

FIG. 16 shows a similar embodiment according to the present disclosure adapted for use in balancing or "tuning" the frequency response of a performance venue or listening environment. System 1600 illustratively incorporates an audio signal source 1502, an audio amplifier 1504, a processing device 1508, a display 1510, a user control device 1512, a speaker 1630, and a microphone 1632.

The output of audio signal source 1502 is applied to audio amplifier 1504 which in turn produces an amplified signal that is applied to speaker 1630, for example. Speaker 1630 may be configured to produce sounds that are directional in character, with the level of directionality being adjustable. The acoustic or sound output 1650 from speaker 1630 may be directed at specific areas or locations within venue 1634, such as walls 1636, permanent structure 1638, e.g., a scoreboard, that acts as a sound reflector, or seats 1640. The returned or reflected sound waves 1652 are picked up by microphone 1632, for example, and applied to processing device 1508, which also receives the original sound signal that is applied to speaker 1630. Processing device 1508 creates tonal and rhythmic visualization components of both the original sound signal produced by speaker 1630 as well as the reflected or returned sound signal 1652. It shall be understood that processing device 1508 can be configured to perform the frequency separation functions of frequency separator 1506 discussed above. For example, if audio signal source is configured to output a multi-frequency signal, such as pink noise, processing device 1508 will separate the signal into individual frequency ranges and generate visual representations for each range. By comparing the tonal and rhythmic visualization components of the original and reflected sound signals, adjustments can be made to the original signal, for example, to minimize particular tonal or percussive feedback reflections. For example, the user may adjust the output level for a certain frequency range to reduce unwanted feedback, vocal "garbling," frequency nodes, or standing audio waves. Such adjustments may be made by electronic means, e.g., through phase shifting of the original signal to match the returned signal 1652 and adjusting characteristics of the original signal to as closely as possible match the visual shape and patterns of the two signals. This comparison and adjustment can be done automatically by a preset or programmed procedure, or manually by visual inspection and adjustment.

Adjustments to the equipment or venue 1634 can also be physically made, such as moving the location or firing direction of the speaker 1630 to avoid or reduce reflected sound from structure 1638, for example, or installing sound absorbing material, e.g., curtains or absorbent foam, at acoustically "live" locations throughout venue 1634. Through such electronic or physical means, venue 1634 can be made more "music friendly" which will greatly contribute to the enjoyment of the listeners. It shall be understood that the disclosed method can be applied to any type of listening environment, including but not limited to, large concert venues, private home theaters, public movie theaters, recording studios, and audio measurement laboratories.

Figure 17:
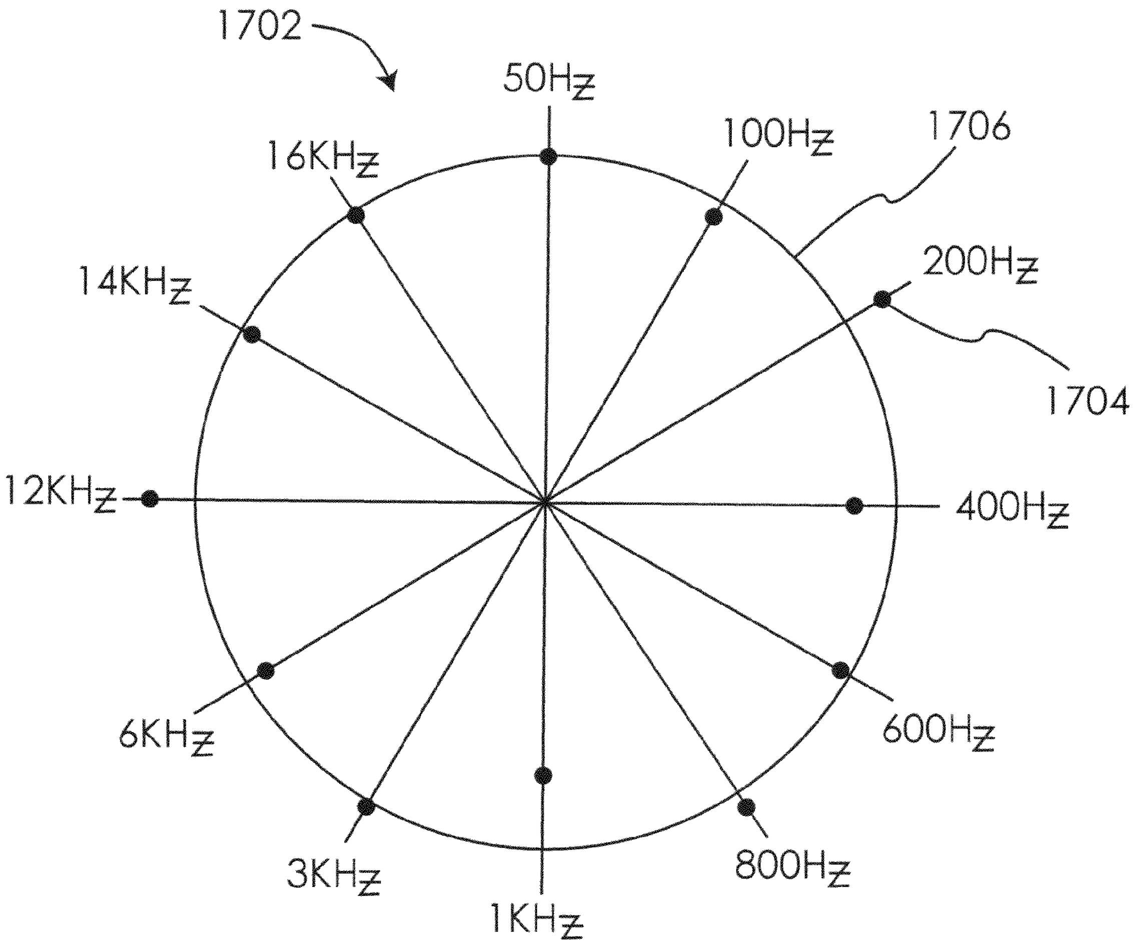
FIG. 17 is an example of a displayed combined visualization for a multi-frequency audio signal according to one embodiment.

FIG. 17 illustrates a visualization created by processing device 1508 according to one embodiment. A tonal circle 1702 is subdivided into a number of frequency intervals determined by the desired accuracy. At each interval, an indicator 1704 is displayed which represents a given frequency. The amplitude of the signal at the given frequency corresponds to the radial distance of the indicator from a reference perimeter 1706. As the amplitude increases or decreases, the indicator will move radially outward or inward respectively. For example, as shown in FIG. 17, there is a higher amplitude at the 200 Hz frequency and a lower amplitude at the 1 KHz frequency. This visualization can be further extended by displaying the circle as a continuous helix upon which the various amplitude indicators are displayed.

Figure 18:
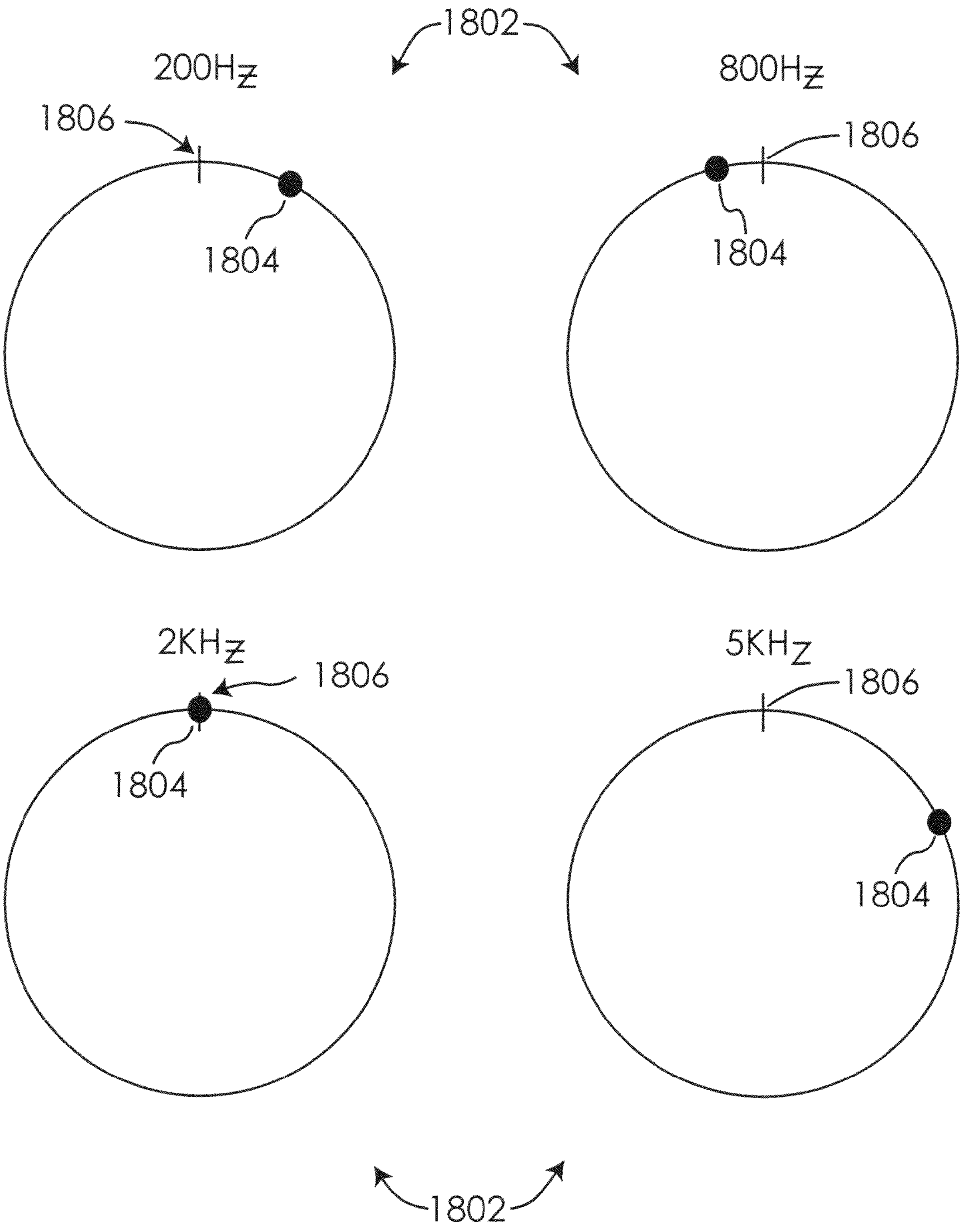
FIG. 18 is an example of separate displayed visualizations for a multi-frequency audio signal according to one embodiment.

FIG. 18 shows another embodiment of the present disclosure in which separate tonal circle visualizations 1802 are shown for each frequency to be measured (200 Hz, 800 Hz, 2 KHz, and 5 KHz in this example). In this embodiment, the amplitude of the reflected signal at a given frequency point corresponds to the distance of the indicators 1804 from a perimeter reference point 1806. As shown in FIG. 18, the signal amplitude of the reflected signal is higher than the reference point 1806 for the 200 Hz and 5 KHz frequency bands. As the user lowers the amplitude of the original signal via user control device 1512, the indicator 1804 will move closer to the reference point 1806. In other embodiments, the amplitude of the signal can be made to correspond to the diameter or color intensity of the indicator 1806, providing the user with additional visual indicators to ease the equalization process.

Figure 19:
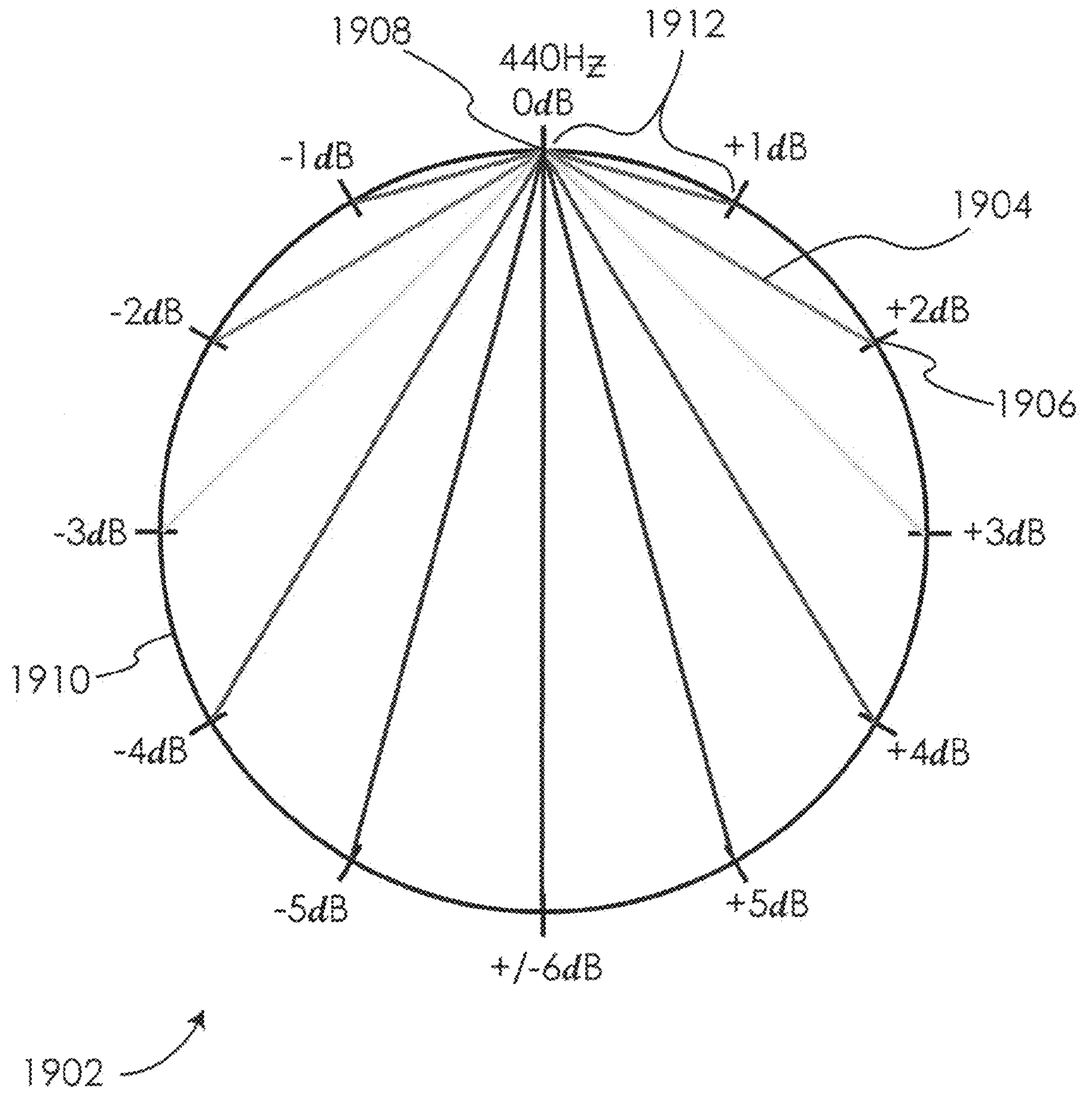
FIG. 19 depicts a visualization scheme for displaying visualizations of various frequency amplitudes within a signal according to one embodiment.

FIG. 19 shows a visualization scheme 1902 according to another embodiment where the color, representing amplitude for a given frequency, of each line 1904 is dependent on the deviation of the sensed amplitude 1906 from a reference or baseline amplitude 1908. FIG. 19 shows the various color gradations which correspond to different points or amplitudes along the circle 1910. As the sensed amplitude increases or decreases from the baseline amplitude 1908, the color of line 1904 will change according to the predefined scheme. As illustrated in FIG. 19, the color of lines 1904 changes from red to orange to yellow to green to blue to purple as the deviation increases. It shall be understood that any desired color scheme may be used.

Figure 20:
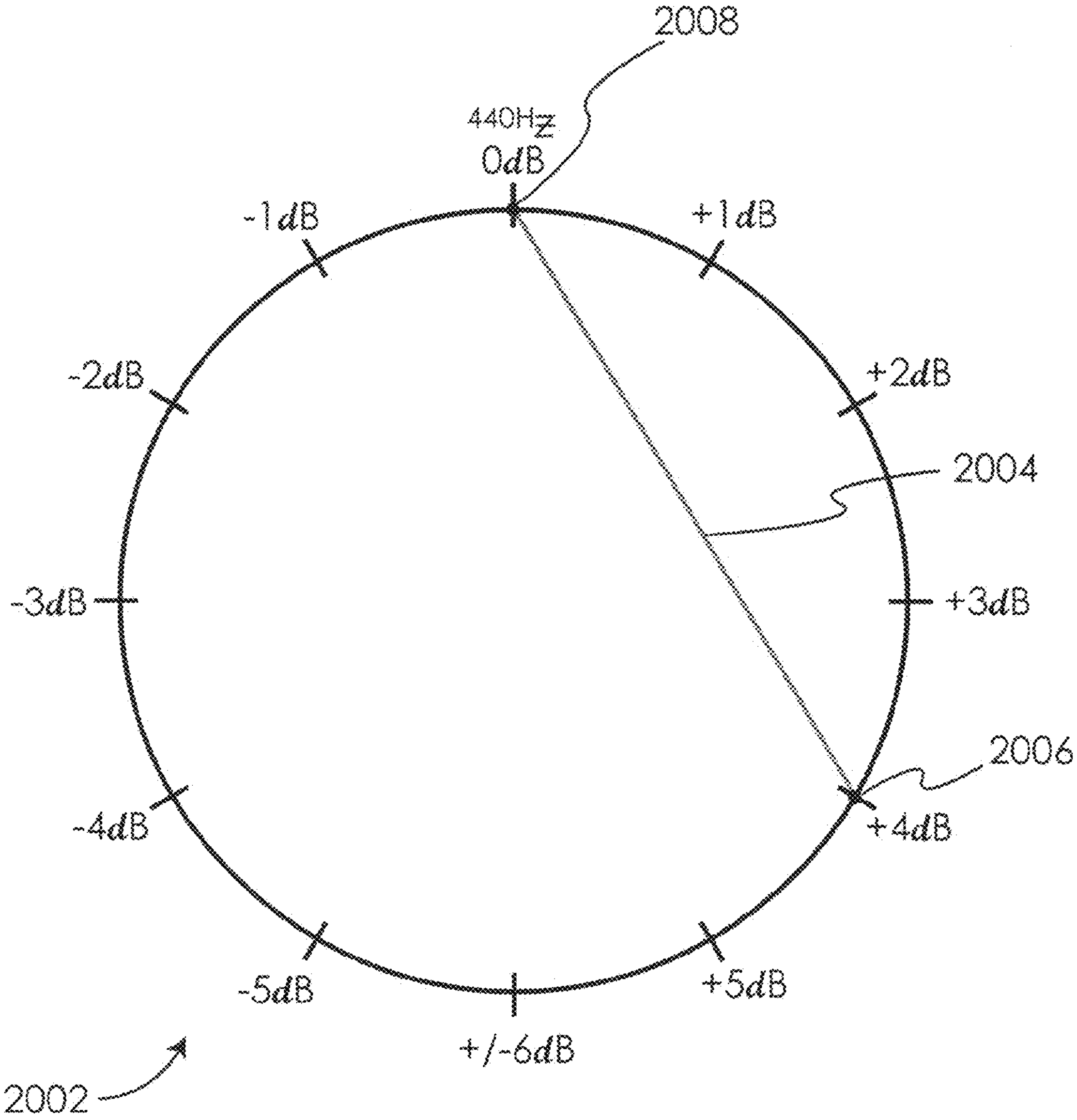
FIG. 20 is an example of a displayed visualization for one frequency component of an audio signal according to the scheme of FIG. 19.

FIG. 20 shows one example where the frequency being evaluated is 440 Hz and the sensed amplitude at that frequency is approximately +4 decibels (dB) above the baseline amplitude 2008, resulting in a green line 2004 being displayed from indicator 2006 to the baseline amplitude 2008. For frequencies having amplitudes falling within the baseline amplitude 1908 and an immediately adjacent amplitude subdivision, an additional repeating rainbow can be displayed within the interval (indicated as 1912 on FIG. 19) to provide more guidance for the user. The degree of accuracy in the visualization 1900 can be adjusted by the user. For example, if the sensed amplitude is within interval 1912, the user can select the visualization 1900 using the mouse 1514 or other input device, whereby the system 1500 will display a new visualization with smaller amplitude gradations. This technique is described further in U.S. Provisional Patent Application Ser. No. 61/025/542 filed Feb. 1, 2008 entitled "Apparatus and Method of Displaying Infinitely Small Divisions of Measurement" which is herein incorporated by reference in its entirety. In addition to amplitude, other signal characteristics can be displayed using the method of the present disclosure. For example, the signal phase in relation to an established time reference can be displayed using the circular representations discussed above. Information concerning the amount of compression or limiting can also be displayed, along with data representing thresholds, rates, attacks, and release.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a", "an," "said," and "the" are not limited to a singular element, and may include one or more such elements.

What is claimed:

1. An audio equalization system, comprising:

a user control device;

a processing device operatively connected to said user control device; and a display operatively connected to said processing device, wherein:

said processing device executes computer readable code to create a first visual representation of a first audio signal for output on said display;

wherein:

said first visual representation is generated according to a method comprising the steps of:

(a) labeling the perimeter of a circle with a plurality of labels corresponding to a plurality of frequency bands, such that moving radially inward or outward from any one of said labels represents a change in a signal amplitude at the frequency corresponding to said one of first labels;

(b) identifying a first occurrence of a signal having a first amplitude at a first frequency; and (c) graphically indicating a point along a radial axis corresponding to said first amplitude; said radial axis connecting the center of said circle and said first label.

2. An audio equalization system, comprising:

(1) a processing device;

(2) a user control device operatively connected to said processing device; and (3) a display operatively connected to said processing device;

wherein:

said processing device executes computer readable code to create a visual representation of a measured amplitude of a first frequency component of a first audio signal for output on said display;

wherein:

said visual representation is generated according to a method comprising the steps of:

(a) providing a first plurality of labels in a pattern of a circular arc, wherein:

(1) the first plurality of labels corresponds to a first plurality of respective amplitudes;

(2) moving clockwise or counter-clockwise on the arc between any one of said labels represents a first amplitude increment;

(b) identifying a target amplitude for the first frequency component of said first audio signal;

(c) determining the measured amplitude of the first frequency component within the first audio signal;

(d) identifying a first label corresponding to the target amplitude;

(e) identifying a second label corresponding to the measured amplitude;

(f) creating a first line connecting the first label and the second label, wherein:

(1) the first line is a first color if the target amplitude and the measured amplitude are separated by the first amplitude increment;

(2) the first line is a second color if the target amplitude and the measured amplitude are separated by a first multiple of the first amplitude increment;

(3) the first line is a third color if the target amplitude and the measured amplitude are separated by a second multiple of the first amplitude increment;

(4) the first line is a fourth color if the target amplitude and the measured amplitude are separated by a third multiple of the first amplitude increment;

(5) the first line is a fifth color if the target amplitude and the measured amplitude are separated by a fourth multiple of the first amplitude increment; and (6) the first line is a sixth color if the target amplitude and the measured amplitude are separated by a fifth multiple of the first amplitude increment.

3. The system of claim 2, wherein step (a) of said method further comprises arranging each of the labels to be substantially evenly spaced from each adjacent label.

4. The system of claim 2, wherein said circular arc comprises a circle.

5. The system of claim 4, wherein moving clockwise up to 180 degrees from said target amplitude on said circle represents an increase in amplitude and moving counterclockwise up to 180 degrees from said target amplitude on said circle represents a decrease in amplitude.

6. The system of claim 2, wherein the first color is red, the second color is orange, the third color is yellow, the fourth color is green, the fifth color is blue and the sixth color is purple.

7. The system of claim 2, wherein:

the first color has a first wavelength that is larger than a second wavelength of the second color;

the second wavelength is larger than a third wavelength of the third color;

the third wavelength is larger than a fourth wavelength of the fourth color;

the fourth wavelength is larger than a fifth wavelength of the fifth color; and the fifth wavelength is larger than an sixth wavelength of the sixth color.

8. The system of claim 2, wherein a plurality of said visual representations are generated on the display using said method, each one of said visual representations corresponding to a different one of a plurality of frequency components of said first audio signal.

9. An audio equalization system, comprising:

(1) a processing device;

(2) a user control device operatively connected to said processing device; and (3) a display operatively connected to said processing device;

wherein:

said processing device executes computer readable code to create a visual representation of a measured amplitude of a first frequency component of a first audio signal for output on said display;

wherein:

said visual representation is generated according to a method comprising the steps of:

(a) providing a first plurality of labels in a pattern of a circular arc, wherein:

(1) the first plurality of labels corresponds to a first plurality of respective amplitudes;

(2) moving clockwise or counter-clockwise on the arc between any one of said labels represents a first amplitude increment;

(b) identifying a target amplitude for the first frequency component of said first audio signal;

(c) providing a second plurality of labels in the pattern of said circular arc between one of said first plurality of labels corresponding to said target amplitude and an adjacent one of said first plurality of labels, wherein:

(1) the second plurality of labels corresponds to a second plurality of respective amplitudes;

(2) moving clockwise or counter-clockwise on the arc between any one of said second plurality of labels represents a second amplitude increment, said second amplitude increment being a subdivision of said first amplitude increment;

(d) determining the measured amplitude of the first frequency component within the first audio signal;

(e) identifying a target label corresponding to the target amplitude from said first plurality of labels;

(f) identifying a measured label corresponding to the measured amplitude from said first plurality of labels or from said second plurality of labels;

(g) creating a first line connecting the target label and the measured label, wherein:

(1) the first line is a first color if the target amplitude and the measured amplitude are separated by the first amplitude increment or if the target amplitude and the measured amplitude are separated by the second amplitude increment;

(2) the first line is a second color if the target amplitude and the measured amplitude are separated by a first multiple of the first amplitude increment or if the target amplitude and the measured amplitude are separated by a first multiple of the second amplitude increment;

(3) the first line is a third color if the target amplitude and the measured amplitude are separated by a second multiple of the first amplitude increment or if the target amplitude and the measured amplitude are separated by a second multiple of the second amplitude increment;

(4) the first line is a fourth color if the target amplitude and the measured amplitude are separated by a third multiple of the first amplitude increment or if the target amplitude and the measured amplitude are separated by a third multiple of the second amplitude increment;

(5) the first line is a fifth color if the target amplitude and the measured amplitude are separated by a fourth multiple of the first amplitude increment or if the target amplitude and the measured amplitude are separated by a fourth multiple of the second amplitude increment; and (6) the first line is a sixth color if the target amplitude and the measured amplitude are separated by a fifth multiple of the first amplitude increment or if the target amplitude and the measured amplitude are separated by a fifth multiple of the second amplitude increment.

10. The system of claim 9, wherein step (a) of said method further comprises arranging each of the first plurality of labels to be substantially evenly spaced from each adjacent label.

11. The system of claim 9, wherein said circular arc comprises a circle.

12. The system of claim 11, wherein moving clockwise up to 180 degrees from said target amplitude on said circle represents an increase in amplitude and moving counter-clockwise up to 180 degrees from said target amplitude on said circle represents a decrease in amplitude.

13. The system of claim 11, wherein the number of labels in said second plurality of labels is equal to a number that is one half of the number of labels in said first plurality of labels.

14. The system of claim 11, wherein the number of labels in said second plurality of labels is equal to a number that is one less than one half of the number of labels in said first plurality of labels.

15. The system of claim 9, wherein the first color is red, the second color is orange, the third color is yellow, the fourth color is green, the fifth color is blue and the sixth color is purple.

16. The system of claim 9, wherein:

the first color has a first wavelength that is larger than a second wavelength of the second color;

the second wavelength is larger than a third wavelength of the third color;

the third wavelength is larger than a fourth wavelength of the fourth color;

the fourth wavelength is larger than a fifth wavelength of the fifth color; and the fifth wavelength is larger than an sixth wavelength of the sixth color.

17. The system of claim 16, wherein said plurality of said visual representations are displayed contemporaneously on the display.

18. The system of claim 9, wherein a plurality of said visual representations are generated on the display using said method, each one of said visual representations corresponding to a different one of a plurality of frequency components of said first audio signal.

19. A device comprising a non-transitory computer readable medium, said non-transitory computer readable medium containing computer executable code for generating a visual representation of a measured amplitude of a first frequency component of a first audio signal;

wherein:

said computer executable code is configured to generate said visual representation according to a method comprising the steps of:

(a) providing a first plurality of labels in a pattern of a circular arc, wherein:

(1) the first plurality of labels corresponds to a first plurality of respective amplitudes;

(2) moving clockwise or counter-clockwise on the arc between any one of said labels represents a first amplitude increment;

(b) identifying a target amplitude for the first frequency component of said first audio signal;

(c) determining the measured amplitude of the first frequency component within the first audio signal;

(d) identifying a first one of said first plurality of labels corresponding to the target amplitude;

(e) identifying a second one of said first plurality of said labels corresponding to the measured amplitude;

(f) creating a first line connecting the first one of said first plurality of said labels and the second one of said first plurality of said labels, wherein:

(1) the first line is a first color if the target amplitude and the measured amplitude are separated by the first amplitude increment;

(2) the first line is a second color if the target amplitude and the measured amplitude are separated by a first multiple of the first amplitude increment;

(3) the first line is a third color if the target amplitude and the measured amplitude are separated by a second multiple of the first amplitude increment;

(4) the first line is a fourth color if the target amplitude and the measured amplitude are separated by a third multiple of the first amplitude increment;

(5) the first line is a fifth color if the target amplitude and the measured amplitude are separated by a fourth multiple of the first amplitude increment; and (6) the first line is a sixth color if the target amplitude and the measured amplitude are separated by a fifth multiple of the first amplitude increment.

20. The device of claim 19, wherein the first color is red, the second color is orange, the third color is yellow, the fourth color is green, the fifth color is blue and the sixth color is purple.

* * * * *